United States Patent
Chandra et al.

(10) Patent No.: US 10,055,777 B1
(45) Date of Patent: Aug. 21, 2018

(54) REAL-TIME USER GENERATED VIRTUAL SHOPPING PARTIES

(71) Applicant: Poshmark, Inc., Menlo Park, CA (US)

(72) Inventors: Manish Chandra, Fremont, CA (US); Gautam Golwala, Sunnyvale, CA (US); Chetan Pungaliya, Fremont, CA (US)

(73) Assignee: Poshmark, Inc., Menlo Park, CA (US)

( * ) Notice: Subject to any disclaimer, the term of this patent is extended or adjusted under 35 U.S.C. 154(b) by 816 days.

(21) Appl. No.: 14/216,961

(22) Filed: Mar. 17, 2014

Related U.S. Application Data

(60) Provisional application No. 61/793,674, filed on Mar. 15, 2013.

(51) Int. Cl.
| | |
|---|---|
| G06F 11/07 | (2006.01) |
| G06F 9/46 | (2006.01) |
| H04L 12/24 | (2006.01) |
| H04W 12/06 | (2009.01) |
| H04W 12/08 | (2009.01) |
| H04W 4/18 | (2009.01) |
| G06Q 30/06 | (2012.01) |
| G06Q 50/00 | (2012.01) |

(52) U.S. Cl.
CPC ......... *G06Q 30/0631* (2013.01); *G06Q 50/01* (2013.01)

(58) Field of Classification Search
CPC ...... G06F 11/0709; G06F 9/468; H04L 41/50; H04W 12/06; H04W 12/08; H04W 4/18
See application file for complete search history.

(56) References Cited

U.S. PATENT DOCUMENTS

| | | | |
|---|---|---|---|
| 7,099,933 B1* | 8/2006 | Wallace | H04L 29/12009 709/203 |
| 7,725,366 B1* | 5/2010 | Franco | G06Q 10/08 705/27.1 |
| 2002/0007292 A1* | 1/2002 | Paxton | G06Q 10/02 705/6 |
| 2002/0046157 A1* | 4/2002 | Solomon | G06Q 30/02 705/37 |
| 2002/0053029 A1* | 5/2002 | Nakamura | G06Q 20/20 726/13 |
| 2008/0255942 A1* | 10/2008 | Craft | G06Q 20/045 705/14.26 |
| 2009/0157479 A1* | 6/2009 | Caldwell | G06F 17/30528 705/14.54 |
| 2009/0254971 A1* | 10/2009 | Herz | G06Q 10/10 726/1 |

(Continued)

*Primary Examiner* — Ig Tai An
(74) *Attorney, Agent, or Firm* — Patent Law Works LLP

(57) ABSTRACT

Virtual shopping parties on a peer-to-peer marketplace are facilitated. A virtual party initiated is reserved by a user of the peer-to-peer marketplace. The virtual party comprises a specific set of items available to a specific set of users during a specific time span. A theme is set for the virtual shopping party dictating parameters for whether an item can be added to the virtual shopping party. The theme also dictates parameters for who can add an item to the virtual shopping party. Invitations are sent for the virtual shopping party to the specific set of users, based on the theme. A customized feed is then presented to each of the set of users that join the virtual shopping party.

20 Claims, 8 Drawing Sheets

(56) References Cited

U.S. PATENT DOCUMENTS

| | | | | |
|---|---|---|---|---|
| 2009/0265255 A1* | 10/2009 | Jackson | ............ | G06F 17/30973 |
| | | | | 705/26.1 |
| 2009/0282125 A1* | 11/2009 | Jeide | .................. | H04L 67/1095 |
| | | | | 709/217 |
| 2010/0205541 A1* | 8/2010 | Rapaport | ............... | G06Q 10/10 |
| | | | | 715/753 |
| 2011/0087731 A1* | 4/2011 | Wong | ...................... | G06F 9/505 |
| | | | | 709/204 |
| 2013/0030879 A1* | 1/2013 | Munjal | .............. | G06Q 30/0207 |
| | | | | 705/7.42 |
| 2013/0073473 A1* | 3/2013 | Heath | .................... | G06Q 30/02 |
| | | | | 705/319 |
| 2014/0046794 A1* | 2/2014 | Vallery | .............. | G06Q 30/0631 |
| | | | | 705/26.7 |
| 2014/0108149 A1* | 4/2014 | Jabara | ................ | G07F 17/3218 |
| | | | | 705/14.64 |
| 2014/0129390 A1* | 5/2014 | Mauge | ............... | G06Q 30/0629 |
| | | | | 705/26.63 |
| 2014/0207611 A1* | 7/2014 | Cleary | ............... | G06Q 30/0633 |
| | | | | 705/26.8 |
| 2014/0279049 A1* | 9/2014 | Wiseman | ................ | H04L 51/32 |
| | | | | 705/14.66 |
| 2015/0012332 A1* | 1/2015 | Papachristos | ......... | H04L 67/125 |
| | | | | 705/7.29 |
| 2015/0134540 A1* | 5/2015 | Law | .................... | G06Q 20/351 |
| | | | | 705/72 |
| 2015/0219610 A1* | 8/2015 | Jackson, Jr. | ....... | G01N 33/0098 |
| | | | | 707/770 |
| 2015/0310569 A1* | 10/2015 | Chong | ............... | G06Q 30/0643 |
| | | | | 705/27.1 |

\* cited by examiner

300

310

320

REAL-TIME USER GENERATED VIRTUAL SHOPPING PARTIES

CROSS-REFERENCES TO RELATED APPLICATIONS

This application claims the benefit of priority under 35 U.S.C. 119(e) to U.S. Application No. 61/793,674, filed Mar. 15, 2013, entitled Real-time User Generated Virtual Shopping Parties, the contents of which are hereby incorporated herein by reference. This application is related to co-pending U.S. application Ser. No. 14/217,255 entitled Using Digital Item Tracking to Drive E-Commerce, having common inventors, the same assignee, and the same filing date as this application, the contents of which are hereby incorporated herein by reference. This application is also related to co-pending U.S. application Ser. No. 14/217,267 entitled Social Merchandising System, having common inventors, the same assignee, and the same filing date as this application, the contents of which are hereby incorporated herein by reference.

TECHNICAL FIELD

This disclosure pertains generally to peer-to-peer electronic marketplaces, and more specifically to real-time user generated virtual shopping parties.

BACKGROUND

E-commerce through online marketplaces is thriving.

When making a purchase online, several supporting vendors contribute to the transaction, such as a warehouse storing physical items for sale, a payment processor to collect and distribute funds, and a transporter for delivery of items. These entities often operate external to and independently of a marketplace, resulting in isolated processes and distributed information adhering to varying formats.

Peer-to-peer marketplaces are a segment of e-commerce in which nearly any individual with access to a networked computing device can become a seller in addition to a buyer, even for selling a single item. However, it is difficult for buyers to identify relevant items amongst the vast diversity of different sellers and items. Further, it is difficult for sellers to find specific users that are interested in their items.

Conventional systems require input by users to identify relevant items. Search terms query a database of products and return a results page of merchandise. Merchandise recommendation systems available from online shopping entities consider products primarily from the prism of the shopper by using shopping history, or to others shoppers, by using general shopping patterns (e.g., recommending products based on purchases by other shoppers viewing similar products). However, these recommendations are based strictly on cold, objective metrics without any consideration for social networking interactions between shoppers.

What is needed is a virtual shopping party technique that aims specific products at specific users during a specific time in a peer-to-peer marketplace.

SUMMARY

The present invention addresses the shortcomings of the prior art by providing methods, computer readable mediums, and computing devices for facilitating virtual shopping parties in a peer-to-peer marketplace.

In one embodiment, a virtual party initiated is reserved by a user of the peer-to-peer marketplace. The virtual party comprises a specific set of items available to a specific set of users during a specific time span. A theme is set with parameters which dictate whether an item can be added to the virtual shopping party. The theme also dictates parameters for who can add an item to the virtual shopping party. Invitations are sent for the virtual shopping party to the specific set of users, based on the theme.

In an embodiment during a specific time span of the virtual party, the specific set of users are allowed to join the virtual shopping party during the specific time span. A customized feed is then presented to each of the set of users that join the virtual shopping party. The feed comprising the specific set of items is personalized for each attendee of the party, the customization based on compatibility between items added to the party and currency.

Advantageously, the techniques herein allow highly-customized, scalable discovery of products in a user generated e-commerce platform.

DESCRIPTION

Methods, computer readable mediums (non-transitory), and computing devices for facilitating virtual shopping parties in a peer-to-peer marketplace, are described.

Peer-to-peer marketplaces enable the buying and selling of products between various users. Such users can be individuals, small businesses or even large businesses. In a peer-to-peer marketplace, any user can choose to sell or buy from the marketplace, and can often play both roles.

Real-time virtual shopping parties are a form of a peer-to-peer marketplace, which can be created by users operating mobile computing devices in a mobile client-server architecture (in some embodiments, non-mobile client computers are also used) that can connect up to millions of people live, and use streaming processes to send product information to a central server, which reorganizes the information and broadcasts it to users. This creates a television like broadcast experience for up to millions of users simultaneously connected around a single shopping party. In some embodiments, real-time engines can be used to assemble feeds for each "showroom" in a party, and users can browse the items listed in the party both at the time of the party and beyond.

Figure 1:
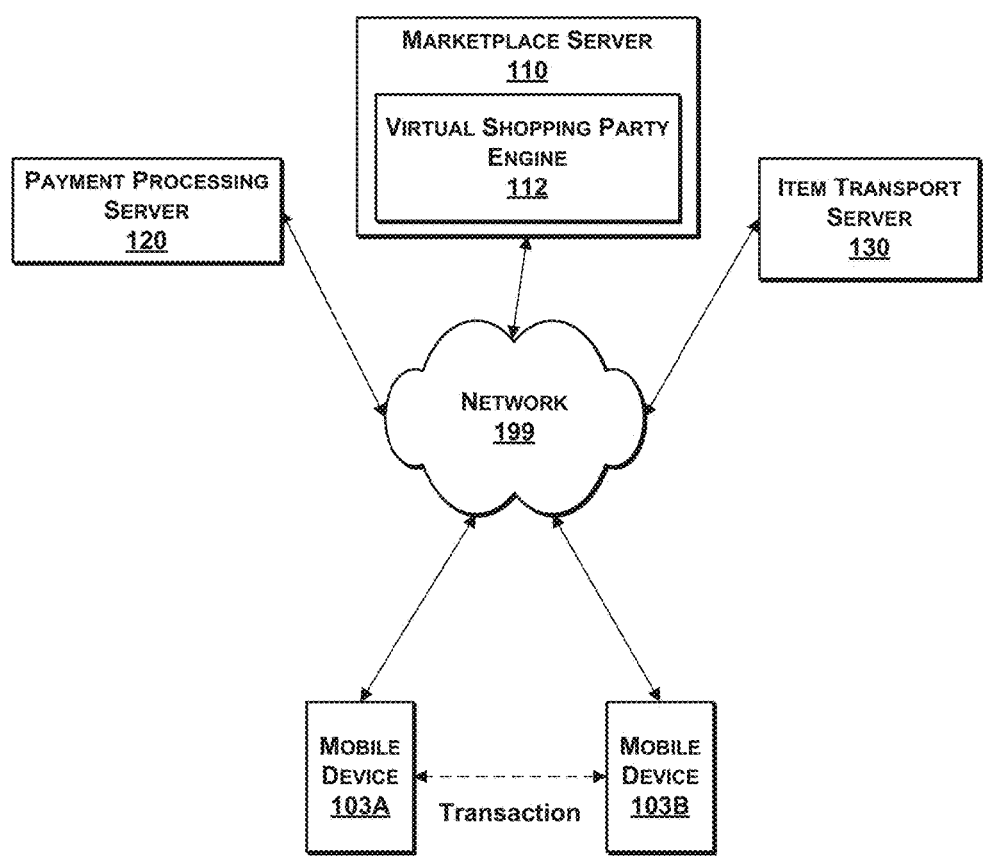
FIG. 1 is a high-level block diagram illustrating a virtual shopping party system, according to one embodiment of the present invention.
Figure 2:
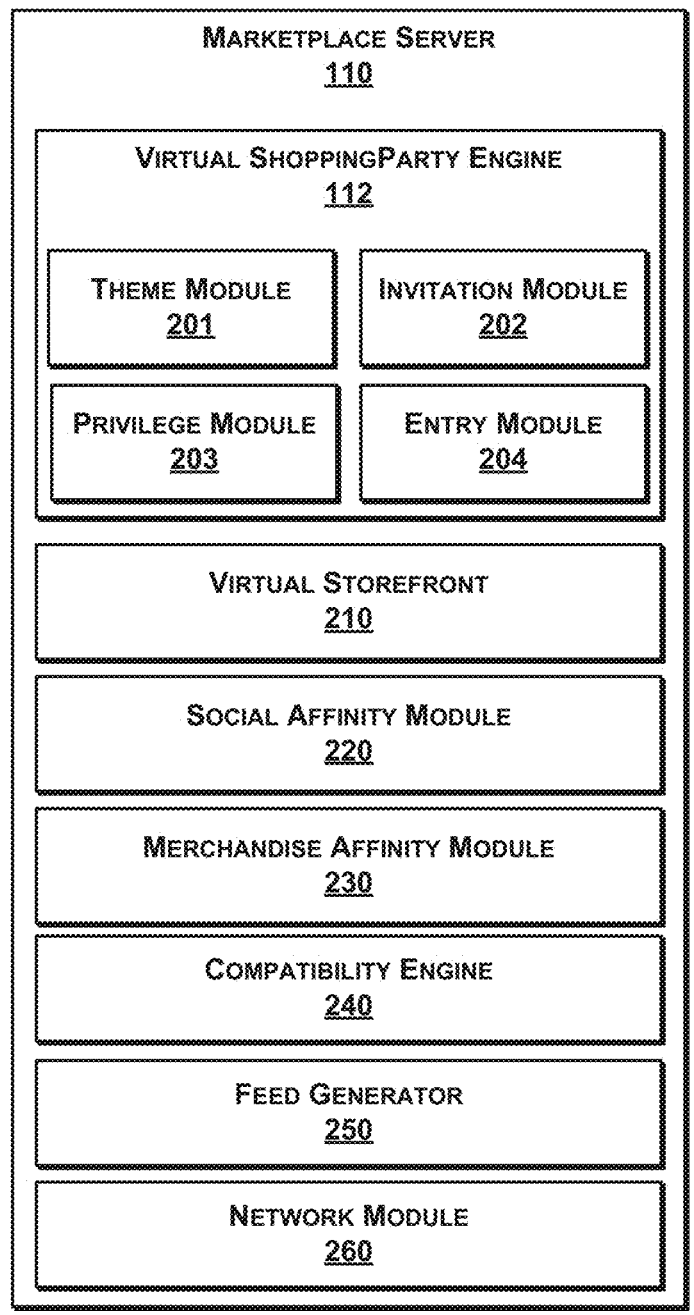
FIG. 2 is a more detailed block diagram of a marketplace server of FIG. 1 with a virtual party engine, according to one embodiment of the present invention.

Systems for Virtual Shopping Parties (FIGS. 1-3)

FIG. 1 is a block diagram illustrating an exemplary network architecture in which a virtual shopping party system 100 can be implemented. The illustrated network architecture comprises multiple mobile devices 103A, 103B, connected to a network 199 which is also connected to a marketplace server 110, a payment processing server 120 and an item transport server 130.

The marketplace server 110 comprises a virtual party engine 112. It is understood that the marketplace server 110 is implementable in a server blade, desktop or mobile PC, a virtual application server, or any suitable processor-based environment. In one aspect, the marketplace server 110 hosts peer-to-peer shopping galleries, social merchandising, virtual shopping parties, virtual storefronts, and the like. Buyers and sellers can log on to the marketplace server 110 to conduct transactions for various items and services. The marketplace server 110 uses back-end resources, including the payment processing server 120 and the item transport server 130, to execute the transaction and for delivery.

In another aspect, the marketing server 110 provides a virtual shopping party to offer a specific set of items available to a specific set of users during a specific time span. A creator sets a theme and invitations are sent out to invitees. During the virtual shopping party, attendees are allowed to join and receive a custom feed of merchandise. The feed is organized for each user of the peer-to-peer marketplace participating in the virtual party. To do so, the feed is populated with virtual party items deemed to be of interest by taking into consideration various characteristics of users, social connections of the user, various characteristics of available items, and time. In yet another aspect, virtual party items can be further segregated into showrooms, with separate feeds. For example, a showroom can be organized for Chanel purses, or purses under $100. The showrooms can also be personalized to the user, for example, to organize virtual party items of sellers from past purchases, from a social graph, or the like. Additional embodiments of the marketplace server 110 (i.e., FIG. 2) and its operations (e.g., FIG. 4) are described in more detail below.

In general, peer-to-peer marketplaces enable the buying and selling of products between various users. Such marketplaces can be general, limited to clothes or books, involve bidding in auctions, or any collection of merchandise. The users can be individuals, small businesses or even large businesses. In a peer-to-peer marketplace, any user can choose to sell or buy from the marketplace, and can often play both roles. Galleries are configured with physical products, digital products, and services. Peer to peer marketplaces are structured with a variety of approaches and choices to each consumer from payment, pricing and shipping. It may allow the seller to ship using a variety of shipping services, such as the US Postal Service, UPS or FedEx. Finally the money is typically directly paid to the seller by the buyer. Virtual shopping parties are a subset of the peer-to-peer marketplace, as defined.

The mobile devices 103 can be implemented in any of the devices set forth for the marketplace server 110. For example, a smart phone, tablet device or laptop computer, executing a mobile browser or a downloaded app can access the marketplace server 110 over an IP or a 4G communication channel. The mobile devices 103 display a user interface, allowing users to directly interface with the marketplace server 110.

The payment processing server 120 can be implemented in any of the devices set forth above. Available payment mechanisms on the payment processing server 120 can be credit or debit cards, electronic checks, electronic coupons or gift cards, wire transfers, or any other financial transactions across networks in support of transactions on the marketplace server 110. The payment processing server 120 can be any payment processing service whether or not actually connected to an ACH (Automated Clearing House) backbone. Exemplary payment processing services can be any suitable service such as those provide by PayPal, Amazon Payments, online Visa, Master Card and American Express services, Western Union, QuickBooks, Google Checkout, and the like. The payment processing server 120 operating on the back-end of the network architecture can be invisible to a buyer and seller who preferably interact with a single user interface of the marketplace server 110.

The item transport server 130 is also implementable in any of the devices described above. The item transport server 130 can be in communication with one or more external transport system databases, managed by entities such as the US Postal Service, UPS, Federal Express, DHL, PO box providers, and the like. The item transport server 130 can use RFID tags, scanners, satellite networks, and other resources to track an item from when the label is printed by a seller until delivered and accepted by a buyer. Intermittent statuses are variable, and can include data such as location, date, time, expected arrival times, actual arrival times, and more.

In general, mobile devices 103 and servers 110, 120, 130 can be implemented using computer systems 210 such as the one illustrated in FIG. 6 and described below. The mobile devices 103 and servers 110, 120, 130 are communicatively coupled to the network 199, for example via a network interface such as a WiFi card and/or software. Mobile devices 103 are able to access applications and/or data on servers 110, 120, 130 using, for example, a web browser or other client software (not shown).

In a more general sense, functionalities of components described herein can be distributed between multiple computer systems, including within a cloud-based computing environment in which the functionality in question is provided as a service over a network. It is to be understood that although the mobile device app and the virtual shopping party system 100 are illustrated in FIG. 1 as single entities, these components represent collections of functionalities, which can be instantiated as single or multiple modules as desired. It is to be understood that the modules of the mobile device app and of the virtual shopping party system 100 can be instantiated (for example as object code or executable images) within the system memory (e.g., RAM, ROM, flash memory) of any computer system, such that when the processor of the computer system processes a module, the computer system executes the associated functionality. As used herein, the terms "computer system," "computer," "client," "client computer," "server," "server computer" "mobile communication device" and "computing device" mean one or more computers configured and/or programmed to execute the described functionality. Additionally, program code to implement the functionalities of the virtual shopping party system 100 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In one embodiment, a mobile device app is in the form of an iOS app for an iPhone, iPad, iPod touch or other similar mobile device. In other embodiments, a mobile device app can be in the form an app written for a different mobile operating system, such as Android, Windows Phone, Blackberry OS, etc. Clients in the form of laptops or desktops can run applications written for their corresponding operating systems (e.g., Windows, Mac OS, Linux, etc.).

FIG. 2 is a more detailed block diagram of a marketplace server 110 of FIG. 1, according to one embodiment of the present invention. The marketplace server 110 includes the virtual shopping party engine 112, a virtual storefront 210, a social affinity module 220, and a merchandise affinity module 230, a compatibility engine 240, and a feed generator 250. Different configurations are possible. These components can be implemented in hardware, software (e.g., as stored on a non-transitory computer readable medium), or a combination of both. In various embodiments, the functionalities can be grouped into different components, or can be distributed across various computing devices.

The virtual shopping party engine 112 leverages components of the marketplace server 110 using specific parameters of a theme to facilitate virtual shopping parties within the peer-to-peer marketplace, as now described. Detailed embodiments of the virtual shopping party engine 112 are set forth below.

The virtual storefront 210 can be a digital gallery of products made available for peers who can be buyers and sellers, or vice versa. In one embodiment, virtual parties are a subset of items available from the virtual storefront 210 (e.g., in a shopping party virtual storefront). In another embodiment, virtual parties partially or fully include items that are exclusive to virtual shopping parties. An item from a virtual party can be selected and moved to a shopping cart as a cache of intended purchases. The virtual storefront 210 can provide a checkout at which point delivery information and financial information is input to form fields. A transaction number (e.g., a unique transaction number) is assigned for tracking the transaction. A history of transactions and item details from transactions for a virtual party stored in a database (not pictured) is associated with a user profile.

The social affinity module 220 can be accessed by the virtual shopping party engine 112 to rank and match a specific user, a group of users, a type of user, or the like, to others using compatibility scores determined by algorithms of the compatibility engine 240. As a result, item recommendations are made for one user based on other users with similar social characteristics, or based on other users having a social connection. Also, recommendations are responsive to characteristics of a creator of a virtual party or others that provide items. For example, users in close proximity are more likely to conduct a transaction and can avoid shipping. Users having common hobbies or habits may also share certain shopping habits. Another example pairs users based on items in their virtual closets. The closets include clothes and shoes of a certain size. Thus, users of similar sizes could have an interest in purchasing clothes from each other. Additional social matching factors that are unrelated to merchandising are also possible (e.g., friends of other social networks, e-mail or telephone contacts, and the like).

In one embodiment, compatibility scores for the social affinity module 220 are calculated by the compatibility engine 240 when determining social affinity by grouping scores of characteristics (or genes) into aggregate scores for categories (or genomes). Although many different types of genomes can be implemented, a producer genome, a consumer genome, and a social genome are used for the purpose of illustration herein. Matching can be based on a minimum threshold of compatibility score, or can be based on a predefined number having the highest relative compatibility.

In more detail, the compatibility engine 240 executes algorithms against each user having a user profile. A compatibility score (e.g., a social compatibility score, or social affinity score) can be calculated as an aggregate of selected factors. For example, producer genome values of price attractiveness, production quality, and shipping promptness can be derived from genes including average listing price, average time to ship, number of items listed, and listing price to original price ratio. In another example, consumer genome categorization as frequent buyer or ratings for satisfiability, for instance, are based on characteristics such as order frequency, return rate, support request, and likes. In a final example, social genome findings of social and helpful are derived from quantifiable genes having values for a number of followers, number following, number of other user's items promoted, number of tags of user in other user's items, and recent educational comments.

Figure 3A:
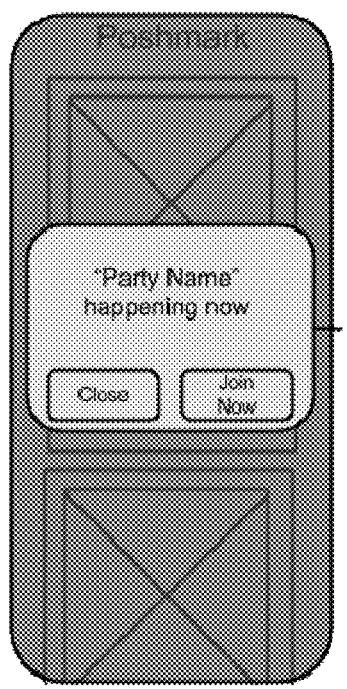
FIGS. 3A-3C are schematic diagrams illustrating wire frames for a user interface in the virtual shopping party system of FIG. 1, according to some embodiments of the present invention.
Figure 3B:
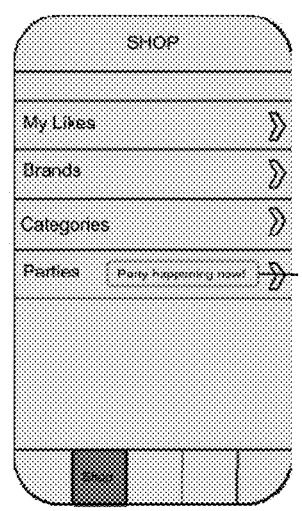
Figure 3C:
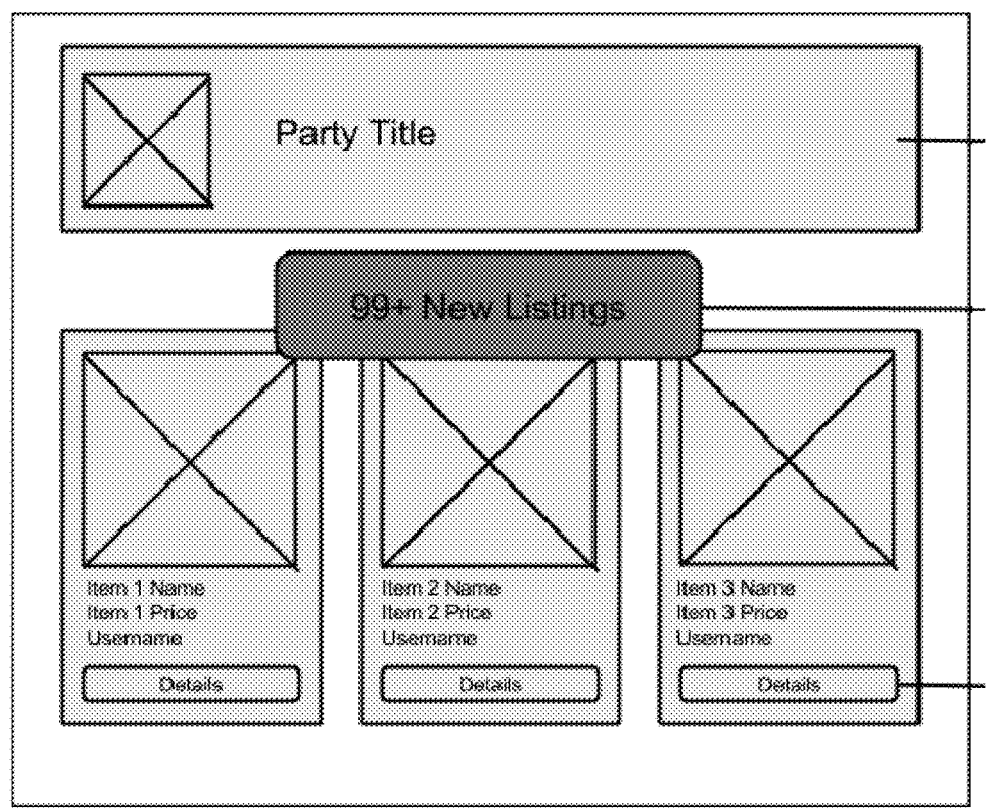
Figure 3D:
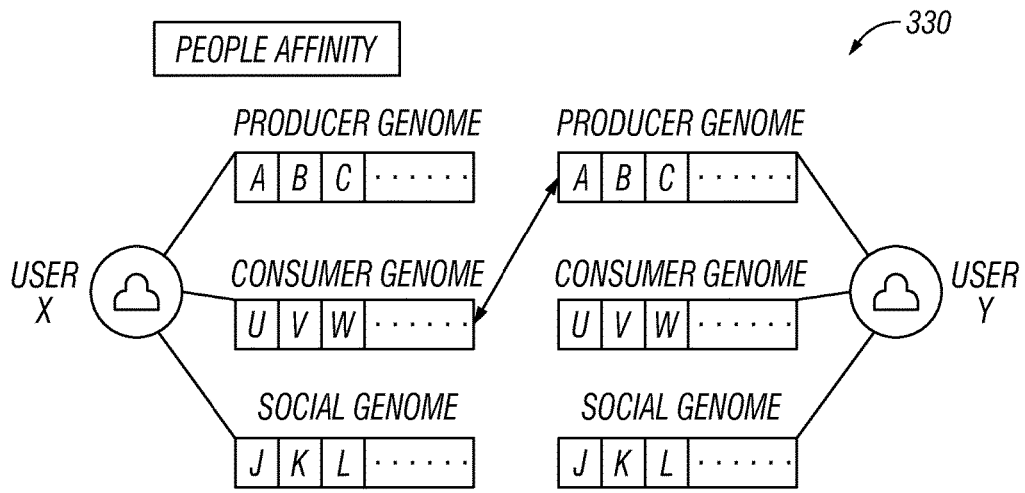
FIGS. 3D-3E are schematic diagrams illustrating genome affinities, according to some embodiments of the present invention.
Figure 3E:
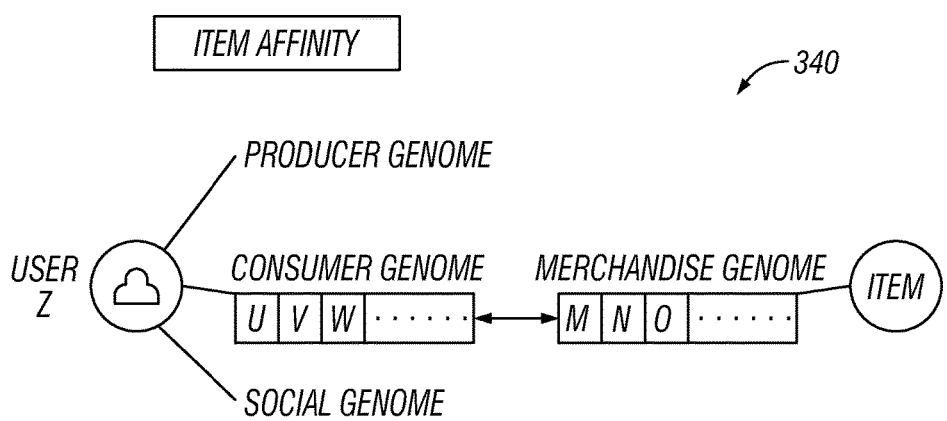

Consumers are matched to items and vice versa (as shown in graph 330 of FIG. 3D). Consumers are also matched with producers (as shown in graph 330 of FIG. 3E). In other embodiments, consumers are matched to other consumers as influencers. Each user is described with an n-value consumer genome chart that specifies the attribute affinity of the user. These affinities are then correlated with an n-valued producer genome chart. The producer and consumer genome chart can but need not be the same for a single user. A compatibility score in this case is computed by quantifying the range of difference between the corresponding genome values. To give a positive affinity score, a quantified range of difference can be subtracted from a constant such as 100. The specific format used for affinity scores can vary between embodiments. Each affinity score can be added to create a compound compatibility score. The score is then used to rank each item in the system. When combined with time, the score can become the secondary attribute used to order the items in a given feed.

In still another embodiment, graph-based affinity can be established by the compatibility engine 240 through a user's following graph as well as any social action performed in the system which include likes, comments, shares, and purchases. As a user builds her following base, the system recommends items based on these actions. For example, if User A likes User B's items, and User B likes User C's items, the system can in turn recommend User C's items to User A.

The merchandise affinity module 230 can be accessed by the virtual shopping party engine 112 to match and rank items also using compatibility scores determined by algorithms of the compatibility engine 240. In response, the feed generator 250 of items are generated for a specific user, a group of users, a type of user, a virtual party, or the like. Feeds can be combined or independent of social affinity module 220 recommendations or rankings. The compatibility engine 240 is further detailed below.

The feed generator 250 provides a live feed as items are added to a virtual party. Feeds can be customized using one or more of the compatibility scores derived from people affinity, item affinity, graph-based affinity, and currency of listing to determine the selection of items and the order of these items in an individual user's feed. The feed can be generated in real-time, at periodic intervals, once, or many times. Locally at a mobile device 103, product information is sent using push, pull, or a combination of technologies. Where a client's state of the product feed is out of synchronization with the server state, the client may pull the current state from the server in order to get in synchronization. This would usually be the case when the user first joins the party, or when the client has been idle for a while. The feed can be a static listing, or a dynamic scroll according to when items were posted (e.g., as shown in user interface 320 of FIG. 3C). Currency is another factor used to administrate feeds. As such, newer postings are more relevant, as are items that will expire (e.g., auctions or virtual parties) in the near future, and items that have recently changed status through a price reduction, update, or otherwise. Feeds can also be filtered to, for example, users in Chicago, or items under $100.

In some embodiments, item recommendations of the merchandising affinity module 230 are affected by social relationships as determined by the social affinity module 220, and in other embodiments, the two determinations are independent. The compatibility engine 240 can classify each item into a merchandising genome for comparison to consumer genomes of users in order to determine a compatibility score (e.g., item compatibility score, or item affinity score). Genes include, but are not limited to, brand, merchandise category, color, size, price, and value. The score, combined with time, determines an order of items in each user's feed.

A network module 260 includes low-level communication software and/or hardware necessary for communication across a medium, and with resources connected to the medium. For example, the network module 230 can represent packet generators used to packetize application data into packets for transport across a wireless data connection, a WiFi card, APIs, or higher level software commands such as Java commands and specific software commands (e.g., scripts).

The Virtual Shopping Party Engine 112

The virtual shopping party engine 112 further comprises a theme module 201, an invitation module 202, a privilege module 203, and an entry module 204.

The theme module 201 implements parties as a virtual shopping event that start and end at specific times. Organizers navigate a user interface to set up party parameters, for example, by selecting predefined choices or entering a value. Each party is created and scheduled as a time-based event with a specific calendar start time and end time.

The invitation module 202 is aware of upcoming parties and the schedule is broadcast to all users, organizers, or just to invitees. Invitees can confirm attendance and perform any required pre-registration. When a party starts, the invitation module 202 notifies or reminds all of the participating users (e.g., as shown in user interface 300 of FIG. 3A), and the theme module 201 activates a virtual shopping party, as defined. A mobile app can be synchronized with party information and set to locally remind a user or a central server can do so using e-mail or SMS (short message service). A user can also use a "Parties" button on a user interface (e.g., as shown in user interface 310 of FIG. 3B) or a search query in order to find desired parties. Search results are ranked based on relevance of search terms and additional criteria such as party schedule, user preferences of brand, size, and category, users followed by a searching user, followers of a user, geography, groups, and the like.

In some embodiments, the entry module 204 controls entrance through "doors" of a virtual party. A party can be open, or limited in various manners. For example, the volume of party goers present at one time can be limited. Based on when the user tries to join the party, a position is assigned in a queue of users waiting to enter. The queue can be implemented as first-come, first-served, or be implemented by factors. Priority factors can include tenure, past orders, sales and products added, size of closet, number of followers, and knowledge and entry of the correct party code, as an example.

Conversely, in an embodiment, the entry module 208 enforces a modifiable set of moderation rules that can be enforced by the system to ensure a good experience for party attendees. A user requests entry which is granted if the user fits the rules, or denied. Additionally, either attendees or products can be removed from the party based on these rules, and can be prevented by the entry module 208 from reentering the party. Criteria that can be used to determine removal include, but are not limited to frequency of adding products to the party (in the case of attendees), quality of products, reports from other attendees, and content moderator's judgment.

The theme module 201 also allows users to start adding qualifying products to the live party in real-time. Some parties have parameters for items that can be added, resulting in an approval or disapproval of submitted items. An optional verification can be performed. Items are added generally to the party, or to a certain showroom. Each product in a party is shoppable, i.e., the users can come and buy those products. When the party ends the users are not allowed to add more products to the party, but in some embodiments they can come, browse and shop the products already in the party.

The privilege module 203 regulates roles and privileges of users. In one embodiment, a party has one or multiple host(s), and each host can add products to the "Host Picks" showroom. Generally, a party creator schedules the party, creates the theme and invites co-hosts to the party. She is automatically a host of the party. A party moderator can remove items from a party as well as block users from the party. An attendee is a user who is allowed to enter the party by the entry module 204. In different embodiments, attendees may or may not have the privilege to add products to the party under different circumstances.

In more detail, creators can create and host their own parties (user created party). This privilege can be granted editorially, by an administrator and/or automatically by the system based on user characteristics such as tenure, past sales, products listed, followers, etc. Users who create their own parties can invite other users to the party. They can invite users based on their social graph (followers, followers of their followers, etc.) or based on attributes of users such as geography, affiliations, school, brand/size/category preferences, etc.

The privilege to attend can be based on certain criteria such as whether the user follows one of the party hosts, whether the user was explicitly invited to this party, whether the user knows and enters the correct party code, geographic location of the user, educational affiliations of the user (school), and other organizational affiliations Party attendees may or may not be allowed to add products to the party. This can be based on the type of the party, as well as the user attending the party. Certain parties may allow only the hosts to add products, while attendees can browse and buy the products. Other parties may restrict the adding of products to users who meet certain criteria. Attributes that can feed into this include, but are not limited to quality and quantity of products sold in the past, number of users invited by this user to this party, number of followers this user has, whether the user knows and enters the correct party code, user reports against this user for poor community behavior, compliance with marketplace policies, and type of seller (boutique, professional, individual, etc.).

Figure 4:
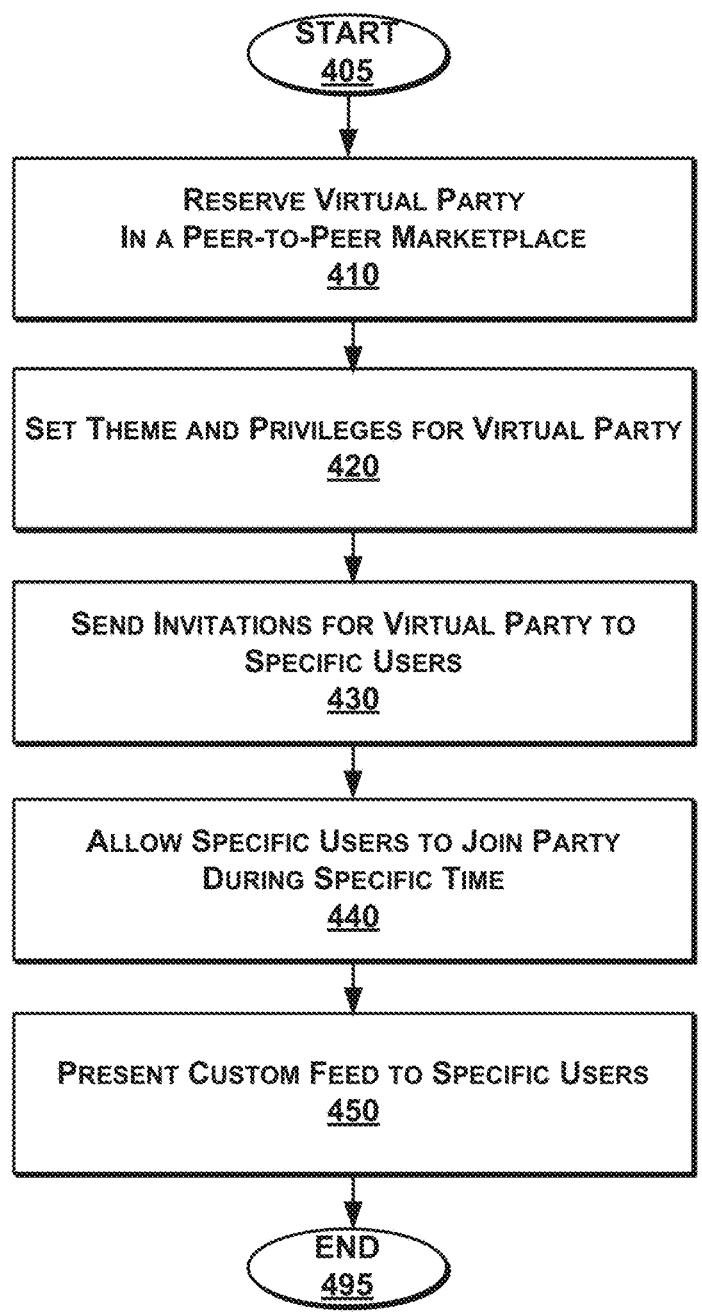
FIG. 4 is a high-level flow diagram illustrating a method for facilitating virtual shopping parties, according to one embodiment of the present invention.
Figure 5:
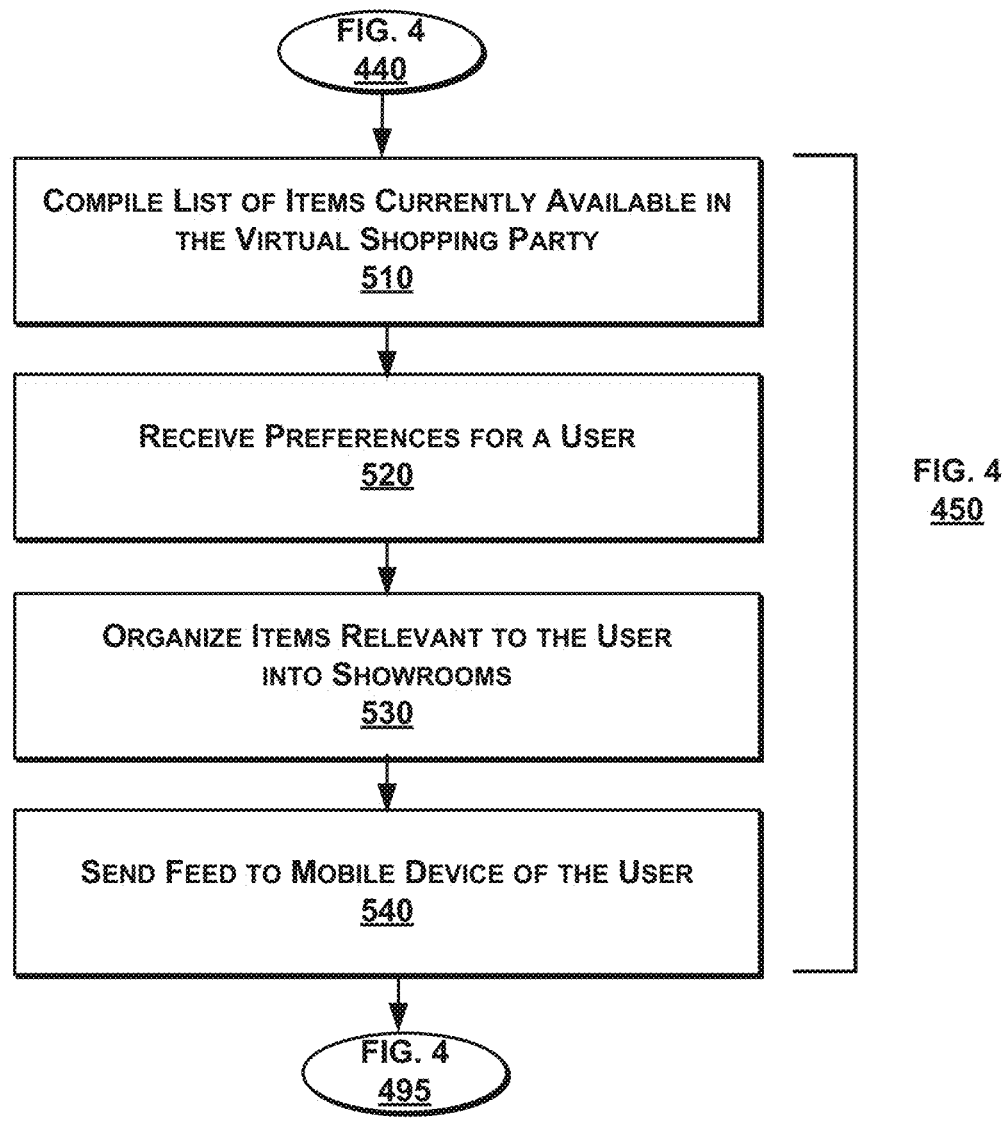
FIG. 5 is a high-level flow diagram illustrating a step of presenting a customized feed for a virtual shopping party, according to one embodiment of the invention.

Methods for Virtual Shopping Parties (FIGS. 4-5)

FIG. 4 is a high-level flow diagram illustrating a method 400 for facilitating a shopping party, according to one embodiment of the present invention. The method 400 can be implemented in, for example, the virtual shopping party system 100, of FIG. 1.

At step 410, a virtual party is reserved as initiated by a user (e.g., from the mobile device 203). At step 420, a theme and privileges set for the virtual shopping party (e.g., by the theme module 201 and the privilege module 203). At step 430, invitations are sent for the virtual shopping party (e.g., by the invitation module 204).

At step 440, specific users invited are allowed to join the virtual party during the specific time (e.g., by the entry module 204). At step 450, a customized feed is presented to each of the users that join the virtual party (e.g., by the feed generator 250).

FIG. 5 is a high-level flow diagram illustrating the step 450 of presenting a customized feed for a virtual shopping party, according to one embodiment of the invention. At step 510, a list of items currently available from the virtual shopping party is compiled. At step 520, preferences of a specific user are received. At step 530, results relevant to a user are organized into showrooms (e.g., by the feed generator 250). At step 540, the feed as organized remotely at a server is sent to a local computing device for display to a user (e.g., by the mobile device 203).

Figure 6:
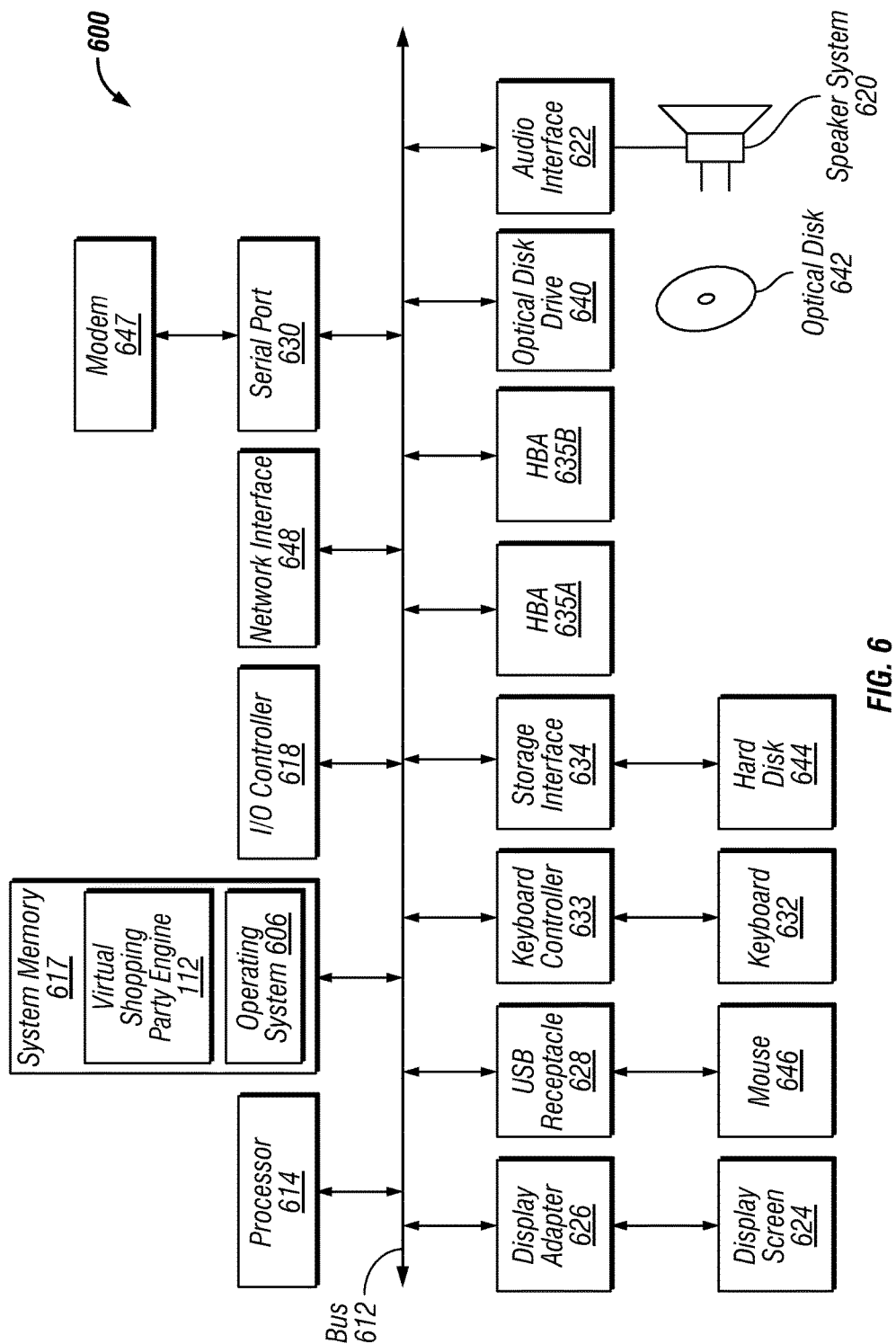
FIG. 6 is a block diagram illustrating a general computing system suitable for components described herein, according to one embodiment of the present invention The Figures depict various embodiments for purposes of illustration only. One skilled in the art will readily recognize from the following discussion that other embodiments of the structures and methods illustrated herein may be employed without departing from the described principles.

Generalities of the Disclosure (FIG. 6)

FIG. 6 is a block diagram of a computer system suitable for implementing the virtual shopping party system 100 and its components. Mobile computing devices, other client computers, and servers can be implemented in the form of such computer systems. As illustrated in FIG. 6, the bus 612 communicatively couples other components of the computer system, such as at least one processor 604, system memory 617 (e.g., random access memory (RAM), read-only memory (ROM), flash memory), an input/output (I/O) controller 618, an audio output interface 622 communicatively coupled to an external audio device such as a speaker system 620, a display adapter 626 communicatively coupled to an external video output device such as a display screen 624, one or more interfaces such as serial ports 630, Universal Serial Bus (USB) receptacles 628, parallel ports (not illustrated), etc., a keyboard controller 633 communicatively coupled to a keyboard 632, a storage interface 634 communicatively coupled to at least one hard disk 644 (or other form(s) of magnetic media), an optical disk drive 640 configured to receive an optical disk 642, a mouse 646 (or other pointing device) coupled to the bus 612 e.g., via a USB receptacle 628, a modem 647 coupled to bus 612, e.g., via a serial port 630, and a network interface 648 coupled, e.g., directly to bus 612.

Other components (not illustrated) may be connected in a similar manner (e.g., document scanners, digital cameras, printers, etc.). Conversely, all of the components illustrated in FIG. 6 need not be present. The components can be interconnected in different ways from that shown in FIG. 6.

The bus 612 allows data communication between the processor 604 and system memory 617, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 644, optical disk 642) and loaded into system memory 617 and executed by the processor 604. Application programs can also be loaded into system memory 617 from a remote location (i.e., a remotely located computer system), for example via the network interface 648 or modem 647. In FIG. 6, the virtual shopping party engine 112 is illustrated as residing in system memory 617. An operating system (OS) 606 is also depicted as residing in the system memory 617. A mobile device app can also reside in system memory 617 of a computer system.

The storage interface 634 is coupled to one or more hard disks 644 (and/or other standard storage media). The hard disk(s) 644 may be a part of computer system, or may be physically separate and accessed through other interface systems.

The network interface 648 and or modem 647 can be directly or indirectly communicatively coupled to a network such as the Internet. Such coupling can be wired or wireless.

As will be understood by those familiar with the art, the subject matter described herein may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the subject matter or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

We claim:

1. A computer-implemented method, in a marketplace server, for facilitating a virtual shopping party in a peer-to-peer marketplace, the method comprising the steps of:

receiving at a marketplace server a request to reserve a virtual shopping party initiated by a user of the peer-to-peer marketplace, the virtual shopping party comprising a specific set of items available to a specific set of users during a specific time span, the specific set of users being matched based on a social affinity by grouping scores of characteristics of the specific set of users;

setting a theme for the virtual shopping party, the theme dictating parameters for whether items can be added to and removed from the virtual shopping party, according to a set of moderation rules, the theme also dictating parameters for who can add items to and remove item from the virtual shopping party, according to the set of moderation rules;

sending a push notification based on a synchronization protocol to user devices of each of the specific set of users representing invitations for the virtual shopping party, based on the theme, according to the set of moderation rules;

allowing any of the specific set of users to join the virtual shopping party by adding any of the specific set of users that respond to the push notification to a priority queue and allowing each of the specific set of users to join the party based on each users position in the queue, wherein the positions in the queue are assigned based on the social affinity of each user and according to the set of moderation rules during the specific time span;

determining whether a state of a product feed of each of the user devices of the specific set of users is out of synchronization with the marketplace server as the users are allowed to join the virtual shopping party;

synchronizing the state of any of the user devices of the specific set of users that are out of synchronization with the marketplace server;

receiving item details in real time associated with qualifying items to be added to the virtual shopping party that meet the set of moderation rules, from any of the specific set of users that are added to the virtual shopping party; and presenting in real time, a customized feed to each of the set of users that are added to the virtual shopping party, the feed comprising the specific set of items as personalized for each attendee of the party, the customization based on compatibility between qualifying items added to the party by any of the specific set of added users and currency according to the set of moderation rules.

2. The method of claim 1, wherein setting the theme for the virtual shopping party comprises:

setting the theme for the virtual shopping party, the theme dictating whether an item can be added to the virtual shopping party based on at least one of product type, product category, brand, price range, and product condition.

3. The method of claim 1, further comprising:

organizing items into one or more virtual showrooms that are personalized for a user based on characteristics of an item and preferences of the user.

4. The method of claim 1, further comprising:

granting a role assignment to one or more users; and assigning privileges with respect to the virtual party to the one or more users based on the role assignment.

5. The method of claim 4, wherein:

granting the role assignment comprises granting a creator role to the one or more users; and assigning a privilege to create a party and a privilege to invite attendees to the one or more users granted the creator role.

6. The method of claim 4, further comprising:

granting the role assignment that comprises granting an attendee role to the one or more users; and assigning a privilege to attend a party to the one or more users granted the attendee role.

7. The method of claim 1, wherein:

presenting in real time the customized feed comprises organizing the feed of items for each attendee of the party based on compatibility between items added to the party, an affinity between each user who added specific items, and each attendee.

8. The method of claim 1, wherein, adding any of the specific set of users that respond to the push notification to the priority queue further comprises:

regulating a volume of the specific set of users at the virtual shopping party at a specific time during the specific time span of the virtual shopping party; and assigning any of the specific set of users that respond to the push notification a position in the priority queue based on when any of the specific set of users attempted to enter the virtual shopping party and at least one of tenure, past order, past sales, past products added, size of closet, and number of followers.

9. The method of claim 1, wherein: the invitations for the virtual shopping party includes a code to invitees of the virtual shopping party and the marketplace server regulates entry to users that present the code.

10. The method of claim 1, further comprising:

regulating items and attendees participating in the virtual shopping party based on at least one of frequency of adding items, quality of items added, and reports from attendees.

11. A non-transitory computer-readable medium storing computer executable instructions that, when loaded into computer memory and executed by at least one processor of a computing device, cause the computing device to perform a method in an order state server, for facilitating a virtual shopping party in a peer-to-peer marketplace, the method comprising the steps of:

receiving at a marketplace server a request to reserve a virtual shopping party initiated by a user of the peer-to-peer marketplace, the virtual shopping party comprising a specific set of items available to a specific set of users during a specific time span, the specific set of users being matched based on a social affinity by grouping scores of characteristics of the specific set of users;

setting a theme for the virtual shopping party, the theme dictating parameters for whether items can be added to and removed from the virtual shopping party, according to a set of moderation rules, the theme also dictating parameters for who can add items to and remove items from the virtual shopping party, according to the set of moderation rules;

sending a push notification based on a synchronization protocol to user devices of each of the specific set of users representing invitations for the virtual shopping party, based on the theme, according to the set of moderation rules;

allowing any of the specific set of users to join the virtual shopping party by adding any of the specific set of users that respond to the push notification to a priority queue and allowing each of the specific set of users to join the party based on each users position in the queue, wherein the positions in the queue are assigned based on the social affinity of each user and according to the set of moderation rules during the specific time span;

determining whether a state of a product feed of each of the user devices of the specific set of users is out of synchronization with the marketplace server as the users are allowed to join the virtual shopping party;

synchronizing the state of any of the user devices of the specific set of users that are out of synchronization with the marketplace server;

receiving item details in real time associated with qualifying items to be added to the virtual shopping party that meet the set of moderation rules, from any of the specific set of users that are added to the virtual shopping party; and presenting in real time, a customized feed to each of the set of users that are added to the virtual shopping party, the feed comprising the specific set of items as personalized for each attendee of the party, the customization based on compatibility between qualifying items added to the party by any of the specific set of added users and currency according to the set of moderation rules.

12. The computer-readable medium of claim 11, wherein in the method, setting the theme for the virtual shopping party comprises:
setting the theme for the virtual shopping party, the theme dictating whether an item can be added to the virtual shopping party based on at least one of product type, product category, brand, price range, and product condition.

13. The computer-readable medium of claim 11, wherein the method further comprises:
organizing items into one or more virtual showrooms that are personalized for a user based on characteristics of an item and preferences of the user.

14. The computer-readable medium of claim 11, wherein the method further comprises:
granting a role assignment to one or more users; and
assigning privileges with respect to the virtual party to the one or more users based on the role assignment.

15. The computer-readable medium of claim 14, wherein in the method:
granting the role assignment comprises granting a creator role to the one or more users; and
assigning a privilege to create a party and a privilege to invite attendees to the one or more users granted the creator role.

16. The computer-readable medium of claim 14, wherein the method further comprises:
granting the role assignment comprises granting an attendee role to the one or more users; and
assigning a privilege to attend a party to the one or more users granted the attendee role.

17. The computer-readable medium of claim 11, wherein in the method:
presenting in real time the customized feed comprises organizing the feed of items for each attendee of the party based on compatibility between items added to the party, an affinity between each user who added specific items, and each attendee.

18. The computer-readable medium of claim 11, wherein the method of adding any of the specific set of users that respond to the push notification to the priority queue further comprises:
regulating a volume of the specific set of users at the virtual shopping party at a specific time during the specific time span of the virtual shopping party; and
assigning any of the specific set of users that respond to the push notification a position in the priority queue based on when any of the specific set of users attempted to enter the virtual shopping party and at least one of tenure, past order, past sales, past products added, size of closet, and number of followers.

19. The computer-readable medium of claim 11, wherein in the method the invitations for the virtual shopping party include a code to invitees of the virtual shopping party and the marketplace server regulates entry to users that present the code.

20. A social merchandising server to match items to users in a peer-to-peer marketplace, the social merchandising server comprising:
a processor; and
a memory, comprising:
a first module to receive a request to reserve a virtual shopping party initiated by a user of the peer-to-peer marketplace, the virtual shopping party comprising a specific set of items available to a specific set of users during a specific time span, the specific set of users being matched based on a social affinity by grouping scores of characteristics of the specific set of users;
a second module to set a theme for the virtual shopping party, the theme dictating parameters for whether items can be added to and removed from the virtual shopping party, according to a set of moderation rules, the theme also dictating parameters for who can add items to and remove items from the virtual shopping party, according to the set of moderation rules;
a third module to send a push notification based on a synchronization protocol to user devices of each of the specific set of users representing invitations for the virtual shopping party, based on the theme, according to the set of moderation rules;
a fourth module to allow any of the specific set of users to join the virtual shopping party by adding any of the specific set of users that respond to the push notification to a priority queue and allowing each of the specific set of users to join the party based on each users position in the queue, wherein the positions in the queue are assigned based on the social affinity of each user and according to the set of moderation rules during the specific time span, determine whether a state of a product feed of each of the user devices of the specific set of users is out of synchronization with the marketplace server as the users are allowed to join the virtual shopping party, and receive item details in real time associated with qualifying items to be added to the virtual shopping party that meet the set of moderation rules, from any of the specific set of users that are added to the virtual shopping party;
a fifth module to synchronize the state of any of the user devices of the specific set of users that are out of synchronization with the marketplace server; and
a sixth module to present in real time a customized feed to each of the set of users that are added to the virtual shopping party, the feed comprising the specific set of items as personalized for each attendee of the party, the customization based on compatibility between qualifying items added to the party by any of the specific set of added users and currency according to the set of moderation rules.

* * * * *